(12) United States Patent
Lee et al.

(10) Patent No.: US 7,978,237 B2
(45) Date of Patent: Jul. 12, 2011

(54) METHOD AND APPARATUS FOR CANCELING FIXED PATTERN NOISE IN CMOS IMAGE SENSOR

(75) Inventors: Myoung-Su Lee, Seoul (KR); Su-Hun Lim, Suwon-si (KR); Jin-Kyeong Heo, Suwon-si (KR); Tae-Chan Kim, Gyeonggi-do (KR); Seog-Heon Ham, Suwon-si (KR); Yong-In Han, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 624 days.

(21) Appl. No.: 12/073,625

(22) Filed: Mar. 7, 2008

(65) Prior Publication Data

US 2009/0046177 A1 Feb. 19, 2009

Related U.S. Application Data

(60) Provisional application No. 60/935,447, filed on Aug. 14, 2007.

(51) Int. Cl.
*H04N 5/217* (2006.01)
(52) U.S. Cl. ....................................................... 348/241
(58) Field of Classification Search ........... 348/241–245
See application file for complete search history.

(56) References Cited

U.S. PATENT DOCUMENTS

| | | | |
|---|---|---|---|
| 6,061,092 A * | 5/2000 | Bakhle et al. | 348/243 |
| 6,473,124 B1 | 10/2002 | Panicacci et al. | |
| 6,914,627 B1 | 7/2005 | Dong | |
| 7,554,585 B2 * | 6/2009 | Masuyama | 348/243 |
| 2004/0113052 A1 | 6/2004 | Johanneson et al. | |
| 2007/0273775 A1 * | 11/2007 | Jiang | 348/244 |
| 2008/0143855 A1 * | 6/2008 | Hussey et al. | 348/241 |

FOREIGN PATENT DOCUMENTS

JP 10-313428 11/1998

* cited by examiner

*Primary Examiner* — Timothy J Henn
(74) *Attorney, Agent, or Firm* — Harness, Dickey & Pierce, P.L.C.

(57) ABSTRACT

An apparatus for canceling a fixed pattern noise in a CMOS image sensor includes a storage device, a fixed pattern noise operation circuit, and a fixed pattern noise canceling circuit. The storage device stores first reference fixed pattern noises operated in a vertical blank section of an (n–1)th frame. The fixed pattern noise operation circuit calculates second reference fixed pattern noises based on the first reference fixed pattern noises stored in the storage device and blank fixed pattern noises output in a vertical blank section of an n-th frame and outputs the second reference fixed pattern noises to the storage device to update the first reference fixed pattern noises to the second reference fixed pattern noises. The fixed pattern noise canceling circuit cancels active fixed pattern noises in combination signals based on the combination signals output in an active section of an (n+1)th frame and including the active fixed pattern noises and pixel signals and the second reference fixed pattern noises output from the storage device.

13 Claims, 5 Drawing Sheets

METHOD AND APPARATUS FOR CANCELING FIXED PATTERN NOISE IN CMOS IMAGE SENSOR

PRIORITY STATEMENT

This application claims priority under 35 U.S.C. §119(e) to U.S. Provisional Patent Application No. 60/935,447, filed on Aug. 14, 2007, in the U.S.P.T.O., the entire contents of which are incorporated herein by reference.

BACKGROUND

1. Field

Example embodiments relate to an image sensor, for example, to a method and apparatus for canceling a fixed pattern noise output through each column in a CMOS image sensor.

2. Description of the Related Art

A CIS (CMOS image sensor) is widely being used in various fields due to its merits such as lower voltage operation, lower power consumption, and/or integration in a standard CMOS process, compared to a CCD (charge coupled device), and expected to replace the CCD in many fields in the future. In a CIS, an analog signal output from an APS (active pixel sensor) array is converted to a digital signal. An ADC (analog-to-digital converter) of a higher resolution is used in the CIS for the conversion to a digital signal.

The CIS may be divided into a type using a single ADC and a type using a column ADC. The single ADC type uses a single ADC operating at higher speed to convert the APS analog output signals of all columns with a predetermined or given time to digital signals. While the single ADC type may reduce a chip size, it uses a larger amount of power due to its higher speed operation.

In contrast, the column ADC type may use a plurality of ADCs having a simple structure that are arranged at the respective columns. According to the column ADC type, the chip size increases while the power consumption decreases. The column ADC type may perform a correlated double sampling (CDS) to an analog output voltage that is a pixel output signal and stores a voltage according to the result thereof. Also, the column ADC type in response to a ramp signal generated by a ramp generator may compare a voltage stored during the CDS operation with a predetermined or given reference voltage to provide a comparison result signal for generation of a digital code.

As a need for a high resolution image recently increases, many manufacturers are developing a higher resolution CIS. For a higher resolution CIS, a pixel of a small size is used to improve a feature of mass production through the reduction of the size. When a smaller pixel is used, the degradation of an image quality due to pixel supply power noise may become a bigger issue.

Furthermore, because an ADC capacitor of the minimum size may be used, as the capacitance of the ADC capacitor reduces, each column of the ADC may be mismatched so that a column fixed pattern noise (CFPN) is generated. CFPN may be recognized with the human eye by increasing a system gain in a dark condition.

SUMMARY

To solve the above and/or other problems, example embodiments provide methods and apparatuses for canceling a column fixed pattern noise according to the characteristic of each column of an ADC.

Example embodiments reduce the degradation of image quality.

According to example embodiments, a method for canceling a fixed pattern noise in an image sensor may include calculating a second reference pattern noises based on first reference fixed pattern noises operated in a vertical blank section of a (n−1)th frame and stored in a predetermined or given storage device and blank fixed pattern noises output in a vertical blank section of a n-th frame, updating the first reference fixed pattern noises stored in the predetermined or given storage device to the second reference fixed pattern noises, and/or canceling active fixed pattern noises included in combination signals based on the combination signals including the active fixed pattern noises and pixel signals and the second reference fixed pattern noises output from the storage device, in an active section of an (n+1)th frame, wherein the "n" is a natural number greater than 1.

According to example embodiments, a method for canceling a fixed pattern noise in an image sensor may include calculating a second reference pattern noises based on first reference fixed pattern noises operated in a vertical blank section of a (n−1)th frame and stored in a predetermined or given storage device and blank fixed pattern noises output in a vertical blank section of a n-th frame, updating the first reference fixed pattern noises stored in the predetermined or given storage device to the second reference fixed pattern noises, calculating an average value of combination signals including active fixed pattern noises and pixel signals in an active section of an (n+1)th frame, and/or canceling the active fixed pattern noises included in the combination signals based on the combination signals, the second reference fixed pattern noises output from the storage device, and the average value of the combination signals, in the active section of the (n+1)th frame, wherein the "n" is a natural number greater than 1.

The calculating of the second reference fixed pattern noises may include generating analog constant voltages having a predetermined or given level in response to a control signal, converting the analog constant voltages to first digital signals including noises and a first offset, calculating an average value of the first digital signals, generating second digital signals by adding a second offset to each of the first digital signals, generating the blank fixed pattern noises by subtracting the average value from each of the second digital signals, and calculating the second reference fixed pattern noises based on weighted average values of the first reference fixed pattern noises and the blank fixed pattern noises.

According to example embodiments, a method for canceling a fixed pattern noise in an image sensor may include storing in a predetermined or given storage device first reference fixed pattern noises operated in a vertical blank section of a (n−1)th frame, generating constant voltages in response to a control signal in a vertical blank section of an n-th frame, converting the constant voltages to first digital blank fixed pattern noises through an analog-to-digital conversion, calculating a first average value of the first digital blank fixed pattern noises, generating second digital blank fixed noises by adding a predetermined or given offset to each of the first digital blank fixed pattern noises, generating third digital blank fixed noises by subtracting the first average value from each of the second digital blank fixed pattern noises, calculating second reference fixed pattern noises based on the first reference fixed pattern noises stored in the storage device and the third digital blank fixed pattern noises and updating the first reference fixed pattern noises to the second reference fixed pattern noises, converting analog pixel signals output from a pixel array in an active section of an (n+1)th frame to first digital signals including digital pixel signals and active fixed pattern noises, calculating a second average value of the first digital signals, generating second digital signals by adding the predetermined or given offset to each of the first digital signals, and/or canceling active fixed pattern noises included in the second digital signals based on the second digital signals, the second reference fixed pattern noises output from the storage device, and the second average value.

According to example embodiments, a method for canceling a fixed pattern noise in an image sensor may include calculating reference fixed pattern noises based on blank fixed pattern noises, each of the blank fixed pattern noises being output based on a constant voltage having a predetermined or given level in a vertical blank section of each of a plurality of previous frames, storing the calculated reference fixed pattern noises in a storage device, and canceling active fixed pattern noises by receiving combination signals output in an active section of a present frame and including the active fixed pattern noise and pixel signals and the reference fixed pattern noises output from the storage device.

The canceling of the active fixed pattern noises may include converting analog signals output through a plurality of columns of a pixel array to digital signals using an analog-to-digital converter, obtaining an average value by dividing a total of values of the respective digital signals by the number of columns, generating the combination signals by adding a predetermined or given offset to each of the digital signals, and canceling the active fixed pattern noises for each column by receiving the combination signals, the average value, and the reference fixed pattern noises.

According to example embodiments, an apparatus for canceling a fixed pattern noise in an image sensor may include a storage device storing first reference fixed pattern noises operated in a vertical blank section of an (n−1)th frame, a fixed pattern noise operation circuit calculating second reference fixed pattern noises based on the first reference fixed pattern noises stored in the storage device and blank fixed pattern noises output in a vertical blank section of an n-th frame and outputting the second reference fixed pattern noises to the storage device to update the first reference fixed pattern noises to the second reference fixed pattern noises, and a fixed pattern noise canceling circuit canceling active fixed pattern noises in combination signals based on the combination signals output in an active section of an (n+1)th frame and including the active fixed pattern noises and pixel signals and the second reference fixed pattern noises output from the storage device, wherein the "n" is a natural number greater than 1.

The fixed pattern noise operation circuit may include an analog-to-digital converter converting constant voltages output in the vertical blank section of the n-th frame to first digital signals, a first operation circuit calculating an average value of the first digital signals, a second operation circuit generating second digital signals by adding a predetermined or given offset to each of the first digital signals, a subtractor generating the blank fixed pattern noises by subtracting the average value from each of the second digital signals output from the second operation circuit, and a third operation circuit calculating the second reference fixed pattern noises based on the first reference fixed pattern noises and the blank fixed pattern noises output from the subtractor and outputting the second reference fixed pattern noises to the storage device to update the first reference fixed pattern noises to the second reference fixed pattern noises.

The analog-to-digital converter may convert analog signals output from a pixel array in the active section of the (n+1)th frame to the third digital signals, the first operation circuit calculates an average value of the third digital signals in the active section of the (n+1)th frame, the second operation circuit generating the combination signals including the active fixed pattern noises and the pixel signals by adding the predetermined or given offset to each of the third digital signals in the active section of the (n+1)th frame, and the fixed pattern noise canceling circuit cancels the active fixed pattern noises in the combination signals based on the combination signals, the average value of the third digital signals, and the second reference fixed pattern noises in the active section of the (n+1)th frame.

According to another aspect of the present invention, an image sensor comprises a pixel array having a plurality of unit pixels formed among a plurality of rows and a plurality of columns and outputting analog pixel signals through the columns in an active section, a constant voltage generator supplying a constant voltage having a predetermined or given level to the columns in a vertical blank section, an analog-to-digital converter converting analog signals output from the columns to digital signals, a storage device storing first reference fixed pattern noises operated in a vertical blank section of an (n−1)th frame, a fixed pattern noise operation circuit calculating second reference fixed pattern noises based on the first reference fixed pattern noises stored in the storage device and blank fixed pattern noises output from the analog-to-digital converter in a vertical blank section of an n-th frame and outputting the second reference fixed pattern noises to the storage device to update the first reference fixed pattern noises to the second reference fixed pattern noises, and a fixed pattern noise canceling circuit canceling active fixed pattern noises in combination signals based on the combination signals output from the analog-to-digital converter in an active section of an (n+1)th frame and including the active fixed pattern noises and digital pixel signals and the second reference fixed pattern noises output from the storage device, wherein the "n" is a natural number greater than 1.

The fixed pattern noise operation circuit may comprise a first operation circuit calculating an average value of the digital signals output from the analog-to-digital converter, a second operation circuit generating second digital signals by adding a predetermined or given offset to each of the digital signals, a subtractor subtracting the average value from each of the second digital signals output from the second operation circuit and generating the blank fixed pattern noises, and/or a third operation circuit calculating the second reference fixed pattern noises based on the first reference fixed pattern noises and the blank fixed pattern noises output from the subtractor and outputting the second reference fixed pattern noises to the storage device to update the first reference fixed pattern noises to the second reference fixed pattern noises.

The analog-to-digital converter may convert analog signals output from a pixel array in the active section of the (n+1)th frame to the third digital signals, the first operation circuit calculates an average value of the third digital signals in the active section of the (n+1)th frame, the second operation circuit generating the combination signals including the active fixed pattern noises and the pixel signals by adding the predetermined or given offset to each of the third digital signals in the active section of the (n+1)th frame, and the fixed pattern noise canceling circuit cancels the active fixed pattern noises in the combination signals based on the combination signals, the average value of the third digital signals, and the second reference fixed pattern noises in the active section of the (n+1)th frame.

BRIEF DESCRIPTION OF THE DRAWINGS

The above and other features and advantages of example embodiments will become more apparent by describing them in detail example embodiments thereof with reference to the attached drawings in which.

DETAILED DESCRIPTION OF EXAMPLE EMBODIMENTS

Example embodiments of the present invention will be more clearly understood from the detailed description taken in conjunction with the accompanying drawings.

Various example embodiments of the present invention will now be described more fully with reference to the accompanying drawings in which some example embodiments of the invention are shown. In the drawings, the thicknesses of layers and regions may be exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Also, the use of the words "compound," "compounds," or "compound(s)," refer to either a single compound or to a plurality of compounds. These words are used to denote one or more compounds but may also just indicate a single compound.

Now, in order to more specifically describe example embodiments of the present invention, various embodiments of the present invention will be described in detail with reference to the attached drawings. However, the present invention is not limited to the example embodiments, but may be embodied in various forms. In the figures, if a layer is formed on another layer or a substrate, it means that the layer is directly formed on another layer or a substrate, or that a third layer is interposed therebetween. In the following description, the same reference numerals denote the same elements.

Although the example embodiments of the present invention have been disclosed for illustrative purposes, those skilled in the art will appreciate that various modifications, additions and substitutions are possible, without departing from the scope and spirit of the invention as disclosed in the accompanying claims.

Figure 1:
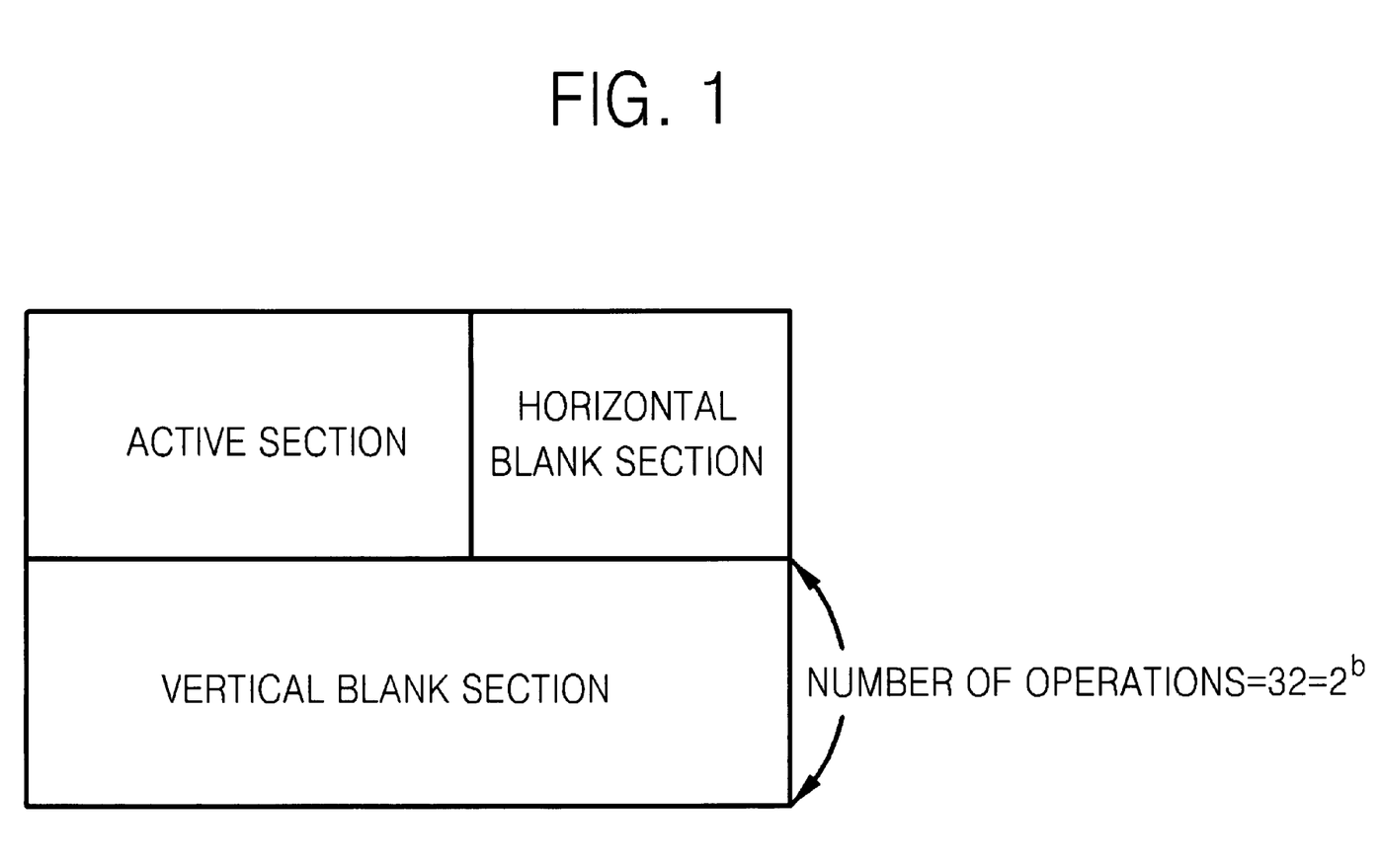
FIG. 1 is a timing diagram of a frame presented in 2 dimensions.

FIG. 1 is a timing diagram of a frame presented in 2 dimensions. Referring to FIG. 1, an image sensor outputs an image or an image signal in an active section, and does not output an image or an image signal in a horizontal blank section or vertical blank section.

Figure 2:
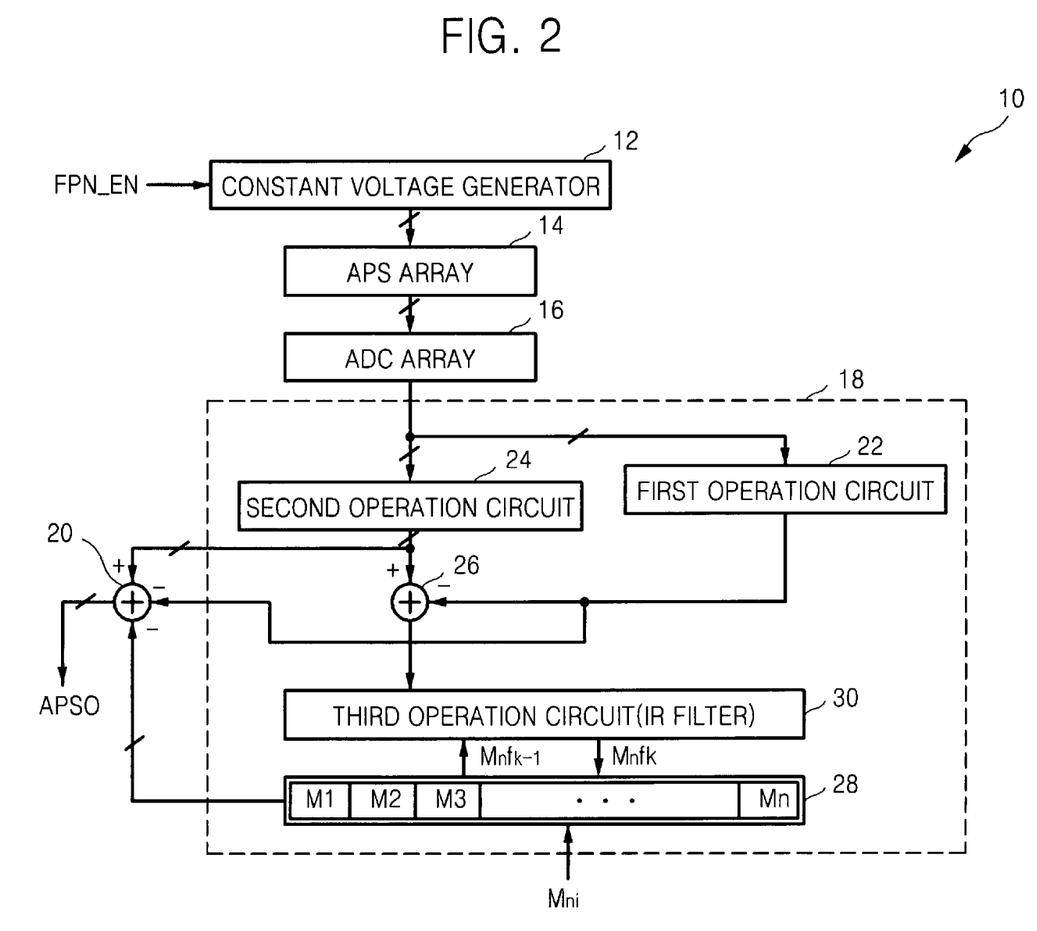
FIG. 2 is a functional block diagram of a CMOS image sensor according to example embodiments.
Figure 3:
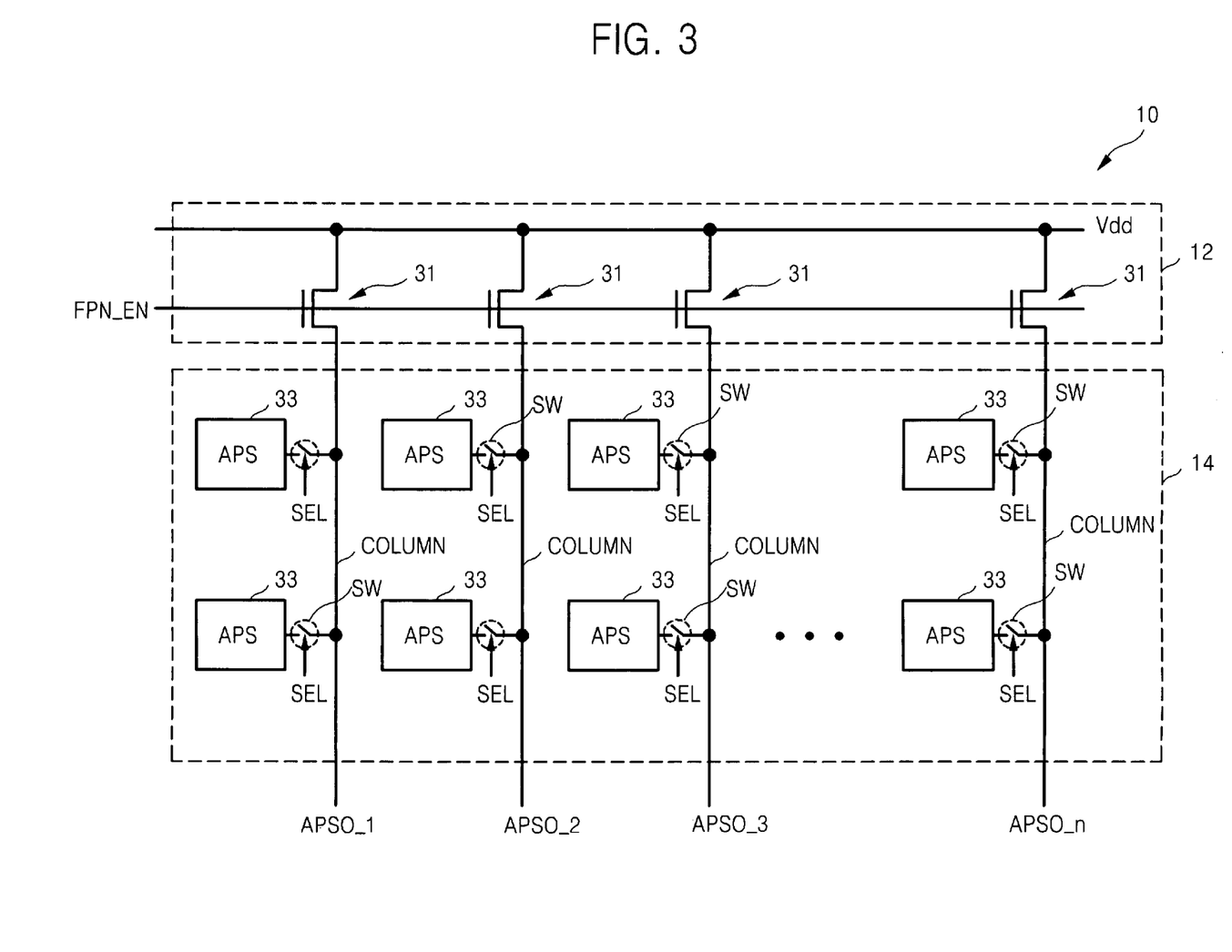
FIG. 3 is a circuit diagram of a constant voltage generator or an APS array shown in FIG. 2.

An apparatus for canceling a fixed pattern noise in an image sensor according to example embodiments or an image sensor having the fixed pattern noise canceling apparatus may cancel active fixed pattern noises in a combination signals output from a plurality of pixels (APSs) 33 of FIG. 3 or an ADC array 16 of FIG. 2 using reference fixed pattern noises that are obtained by using at least two previous frames in the active section and updates the reference fixed pattern noises using the previous reference fixed pattern noises and blank fixed pattern noises in the vertical blank section.

The active fixed pattern noises may signify fixed pattern noises generated in the active section. The blank fixed pattern noises may signify fixed pattern noises generated in the vertical blank section. The active fixed pattern noises or the blank fixed pattern noises may be generated by the ADC array 16.

Figure 4:
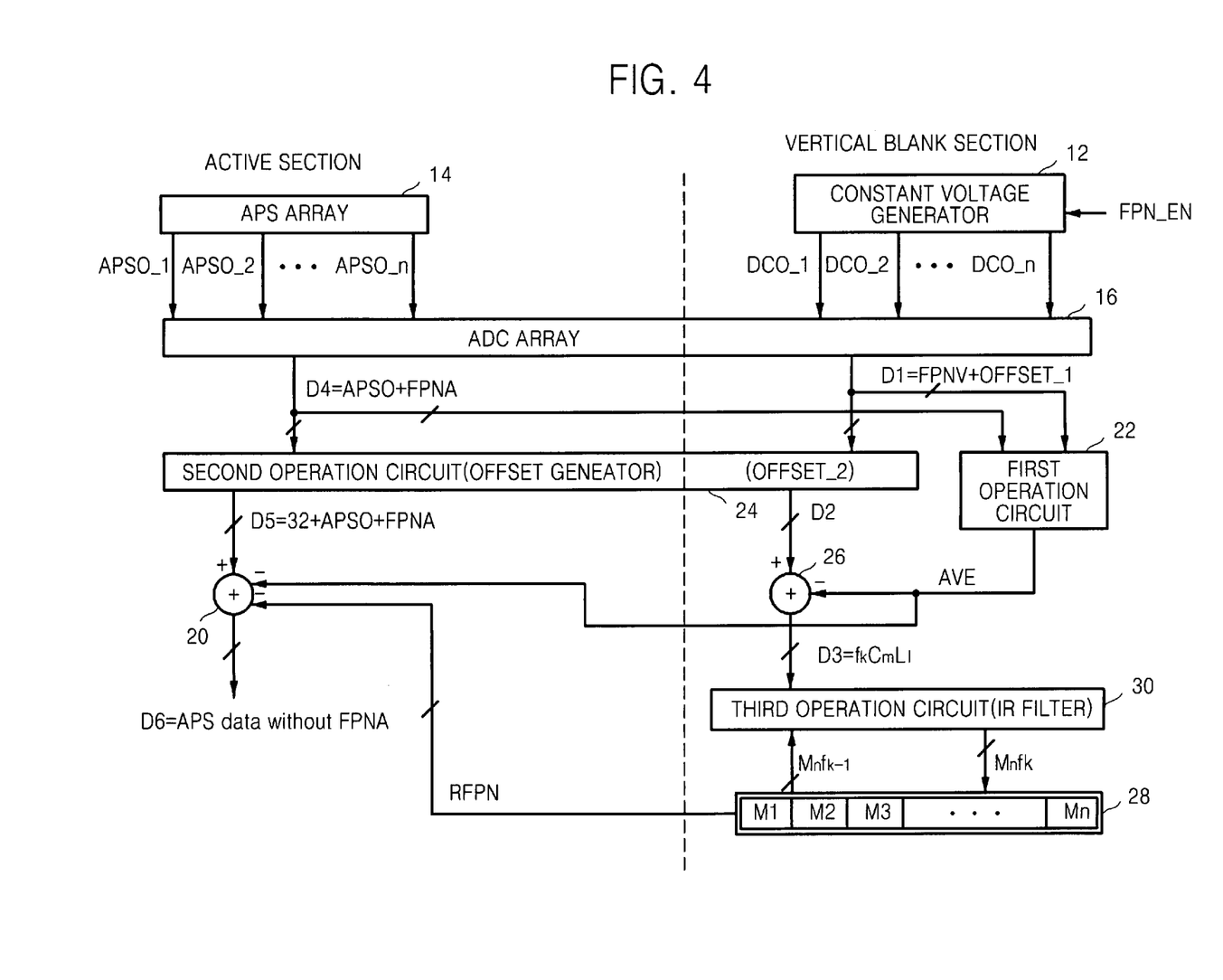
FIG. 4 is a functional block diagram for explaining the operation of a CMOS image sensor according to example embodiments in each operation section.

FIG. 2 is a functional block diagram of a CMOS image sensor according to example embodiments. FIG. 3 is an example circuit diagram of a constant voltage generator and an APS (active pixel sensor) array shown in FIG. 2. FIG. 4 is a functional block diagram for explaining the operation of a CMOS image sensor according to example embodiments in each operation section. Referring to FIGS. 2 through 4, an image sensor 10 may include a constant voltage generator 12, an APS array 14, an ADC array 16, a fixed pattern noise operation circuit 18, and/or a fixed pattern noise canceling circuit 20. The image sensor 10 may further include a row decoder (not shown) to drive the APS array 14 in units of rows. The fixed pattern noise canceling circuit 20 may be embodied by an adder or a subtractor.

Because each of a plurality of switches SW may be turned on in response to an active selection signal SEL output from the row decoder, an image signal output from each of the APSs 33 may be output to a corresponding column. However, in the vertical blank section, each switch SW is turned off in response to an inactive selection signal SEL output from the row decoder.

The constant voltage generator 12 in response to an active control signal FPN_EN may supply a constant voltage having a predetermined or given level to a plurality of columns. The control signal FPN_EN may be activated only in the vertical blank section. The constant voltage generator 12 may be embodied by one or more MOS transistor 31 that may supply the constant voltage to at least one column. However, example embodiments are not limited thereto, that is, a single MOS transistor may supply the constant voltage to one or more columns.

In the MOS transistor 31, to cancel a random noise that may be generated due to the constant voltage, the length of a channel may be much larger than the width of the channel. The APS array 14 may include a plurality of pixels 33 formed between a plurality of rows and columns and outputs pixel signals APSO_1 through APSO_n to the columns in the active section, where n is natural number.

The ADC array 16 may include an ADC (analog-to-digital converter; not shown) arranged at each column. The ADC performs an analog-to-digital conversion as well as CDS (correlated double sampling). Thus, the ADC may be referred to as a CDS/ADC.

The ADC array 16 may receive constant voltages DCO_1 through DCO_n generated by the constant voltage generator 12 and convert the received constant voltages to first digital signals D1 in the vertical blank section. In the active section, the ADC array 16 may receive the signals APSO_1 through APSO_n output by the APSs 33 and convert the received signals to fourth digital signals D4.

The fixed pattern noise operation circuit 18 may calculate reference fixed pattern noises based on the blank fixed pattern noises generated by the ADC array 16 in the vertical blank section in each of at least two previous frames. For example, the reference fixed pattern noises may be an average value or weighted average value of the blank fixed pattern noises of the (n−1)th frame and the blank fixed pattern noises of the n-th frame. However, example embodiments are not limited thereto. In example embodiments, the "n" may be a natural number greater than 2.

The fixed pattern noise operation circuit 18 may include a first operation circuit 22, a second operation circuit 24, a subtractor 26, a storage device 28, and/or a third operation circuit 30. According to example embodiments, the fixed pattern noise operation circuit 18 may include the first operation circuit 22, the second operation circuit 24, the subtractor 26, and/or the third operation circuit 30. In other example embodiments, the fixed pattern noise operation circuit 18 may include the ADC array 16, the first operation circuit 22, the second operation circuit 24, the subtractor 26, and/or the third operation circuit 30. Thus, the fixed pattern noise operation circuit 18 may include one or more of the ADC array 16, the first operation circuit 22, the second operation circuit 24, the subtractor 26, the storage device 28, and the third operation circuit 30.

The storage device 28 may be a memory for storing the reference fixed pattern noises or digital signals corresponding to the reference fixed pattern noises. The memory may be embodied by volatile memories such as SRAMs or non-volatile memories, such as flash memories. An initial value Mni may be written to the storage device 28. In example embodiments, "n" is a natural number.

The first operation circuit 22 may calculate an average value or weighted average value of the first digital signals D1 output from the ADC array 16 in units of columns in the vertical blank section and output a calculated average value or weighted average value AVE. The first digital signals D1 may include blank fixed pattern noises FPNV and a predetermined or given offset OFFSET_1.

Also, the first operation circuit 22 may calculate an average value or weighted average value of the fourth digital signals D4 output in units of columns in the active section. The fourth digital signals D4 may include the pixel signals APSO and the active fixed pattern noises FPNA. The blank fixed pattern noises FPNV and/or the active fixed pattern noises FPNA may be noises generated due to the characteristic of the ADC array 16. The average value or weighted average value may be calculated by dividing a total (or sum) of the digital signals output from the respective columns forming a row or a line by the number of the columns.

The second operation circuit 24 may add an offset to each of the first digital signals D1 or each of the fourth digital signals D4 and output second digital signals D2 or fifth digital signals D5. For example, the offset added to each of the first digital signals D1 or each of the fourth digital signals D4 may be 32 (=0100000.0000000), but example embodiments are not limited thereto. The offset OFFSET_2 (=32) may be the same as the initial value Mni stored in the storage device 28, but example embodiments are not limited thereto.

The second operation circuit 24 may add the predetermined or given offset OFFSET_2 (=32) to each of the first digital signals D1 and output the second digital signals D2 having a level shifted as much as the offset or adds the predetermined or given offset OFFSET_2 (=32) to each of the fourth digital signals D4 and outputs the fifth digital signals D5 having a level shifted as much as the offset. Thus, the second operation circuit 24 may perform a function of a level shifter.

The subtractor 26 may subtract an average value AVE output from the first operation circuit 22 from each of the second digital signals D2 output from the second operation circuit 24 in units of rows in the vertical blank section and outputs third digital signals $f_k C_m L_l$ in units of rows.

The memory 28 may store the reference fixed pattern noises $M_n f_{k-1}$ operated in the vertical blank section of the previous frame. The reference fixed pattern noises $M_n f_{k-1}$ may be updated to a new reference fixed pattern noises $M_n f_k$ in units of rows based on the reference fixed pattern noises $M_n f_{k-1}$ and the blank fixed pattern noises D3 output from the third operation circuit 30 in the vertical blank section of the present frame.

The third operation circuit 30 may receive the reference fixed pattern noises $M_n f_{k-1}$ stored in the memory 28 and the blank fixed pattern noises D3 output from the subtractor 26 and outputs the operated a new reference fixed pattern noises $M_n f_k$ to the memory 28. Thus, the reference fixed pattern noises $M_n f_{k-1}$ stored in the memory 28 may be updated to the new reference fixed pattern noises $M_n f_k$ in units of rows. When "m" times of operations are performed, the reference fixed pattern noises stored in the memory 28 are updated "m" times where "m" is a natural number. Although the third operation circuit 30 may be embodied by an infinite impulse response filter, example embodiments are not limited thereto.

The fixed pattern noise canceling circuit 20 may receive the fifth digital signals D5 output from the active section of the present frame, the reference fixed pattern noises RFPN stored in the memory 28, and the average value AVE and outputs pixel signals D6 where active fixed pattern noises are canceled. The fifth digital signals D5 may include a predetermined or given offset of 32, the pixel signals APSO, and the active fixed pattern noises FPNA.

A control signal FPN_EN may be output from a controller (not shown) that controls data communications between the memory 28 and the third operation circuit 30. Also, the controller may control the output of the reference fixed pattern noises RFPN stored in the memory 28 to the fixed pattern noise canceling circuit 20. In example embodiments, the controller generating the control signal FPN_EN and the controller controlling the data input/output of the memory 28 may be embodied separate from each other.

Figure 5:
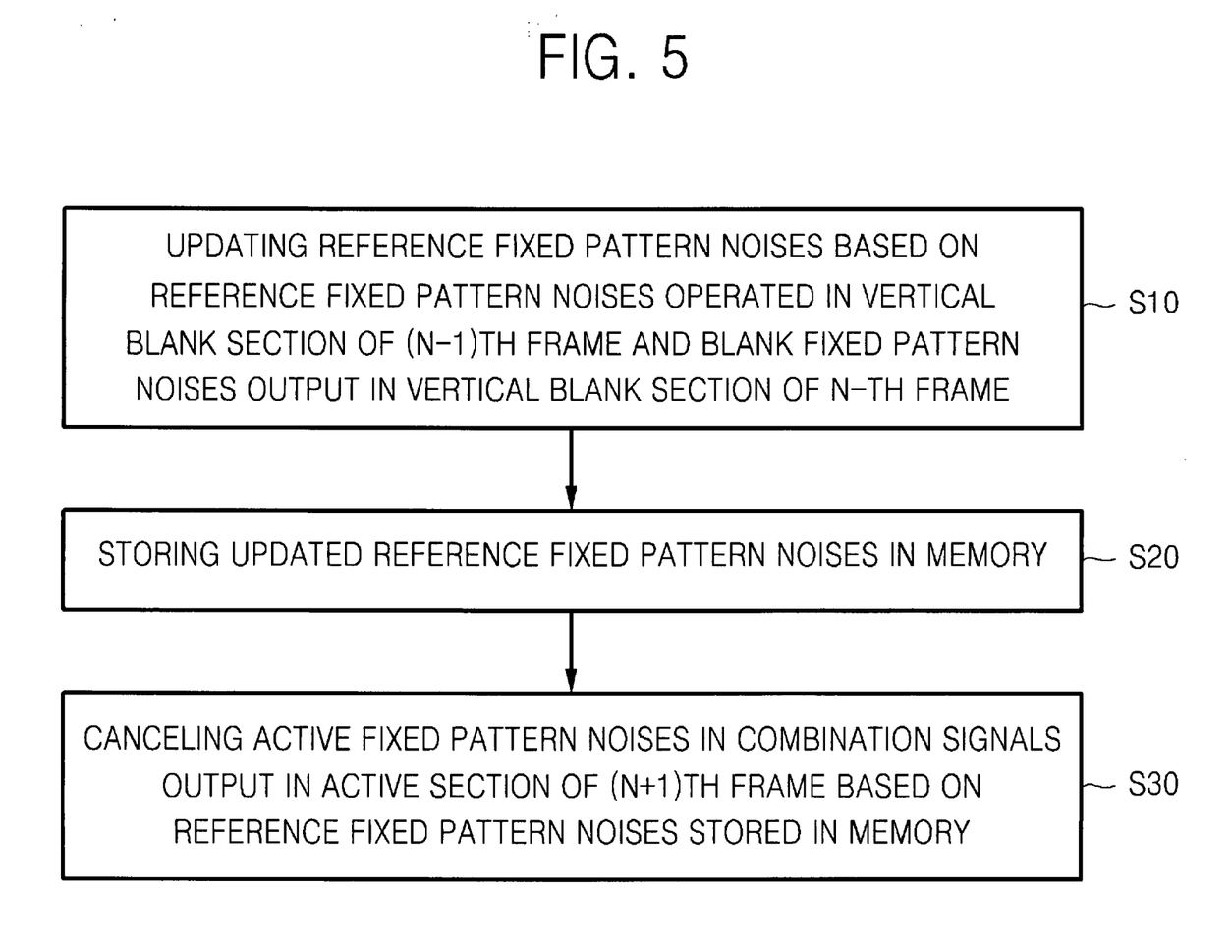
FIG. 5 is a flowchart for explaining a method of canceling a fixed pattern noise in a CMOS image sensor according to example embodiments.

FIG. 5 is a flowchart for explaining a method of canceling a fixed pattern noise in a CMOS image sensor according to example embodiments. Referring to FIGS. 1 through 5, a method of canceling the active fixed pattern noises is described in detail.

It may be assumed that the memory 28 includes unit memories M1-Mn where n is the number of columns, each of the unit memories M1-Mn stores a predetermined or given initial value, for example, 0100000.0000000 (=32)=Mni, and the CDS and ADC are performed 32 times in the vertical blank section. That is, in the vertical blank section, the third operation circuit 30 performs 32 operations and 32 updates in the memory 28. Thus, the operation as in Equation 1 is performed 32 times between the memory 28 and the third operation circuit 30 in the vertical blank section of the first frame or (n−1)th frame f1.

$$M_1 f_1 C_1 L_1 = M_{1i} \times 3/4 + f_1 C_1 L_1 \times 1/128 \quad \text{[Equation 1]}$$
$$M_1 f_1 C_1 L_2 = M_1 f_1 C_1 L_1 + f_1 C_1 L_2 \times 1/128$$
$$M_1 f_1 C_1 L_3 = M_1 f_1 C_1 L_2 + f_1 C_1 L_3 \times 1/128$$
$$\vdots$$
$$M_1 f_1 C_1 L_{32} = M_1 f_1 C_1 L_{31} + f_1 C_1 L_{32} \times 1/128$$

Here, the "$M_{1i}$" is the initial value stored in the first memory M1, for example, 0100000.0000000. The "$f_1 C_1 L_1$" is the value of the blank fixed pattern noise output from the first column C1 of the first frame f1 for the first operation L1. The "$M_1 f_1 C_1 L_1$" is a value that is newly written to or stored in the memory M1 based on the initial value $M_{1i}$ and the value $f_1 C_1 L_1$ of the blank fixed pattern noise.

For a second operation L2, when a new value $f_1 C_1 L_2$ of the blank fixed pattern noise is output from the first column C1 of the first frame f1, the value $M_1 f_1 C_1 L_1$ stored in the first memory M1 is updated to a new value $M_1 f_1 C_1 L_2$ based on Equation 1. Also, for a third operation L3, when a new value $f_1 C_1 L_3$ of the blank fixed pattern noise is output from the first column C1 of the first frame f1, the value $M_1 f_1 C_1 L_2$ stored in the first memory M1 is updated to another new value $M_1 f_1 C_1 L_3$ based on Equation 1.

Referring to Equation 1, it can be seen that the values stored in the respective unit memories M1-Mn, for example, reference fixed pattern noises, are updated in units of rows. When the third operation circuit 30 performs the 32 operations in the above method, the value $M_1 f_1 C_1 L_{32}$ obtained through Equation 2 is finally stored in the first memory M1. The value $M_1 f_1 C_1 L_{32}$ becomes the reference fixed pattern noise of the first column C1 of the first frame f1.

$$M_1 f_1 C_1 L_{32} = M_{1i} \times 3/4 + (f_1 C_1 L_1 + f_1 C_1 L_2 + f_1 C_1 L_3 + \ldots + f_1 C_1 L_{32})/128 \quad \text{[Equation 2]}$$

If the initial value $M_{1i}$ stored in the first memory M1 is 32 (=0100000.0000000) and each of the output values $f_1 C_1 L_1 \sim f_1 C_1 L_{32}$ output from the subtractor 26 is 32 (=0100000.0000000), the reference fixed pattern noise $M_1 f_1 C_1 L_{32}$ finally stored in the first memory M1 is 32 (=0100000.0000000).

Referring to Equations 1 and 2, the value $M_2 f_1 C_2 L_{32}$ stored in the second memory M2 at the first frame as the result of the 32 times of operations is as shown in Equation 3. The value $M_2 f_1 C_2 L_{32}$ is the reference fixed pattern noise of the second column C2 of the first frame f1.

$$M_2 f_1 C_2 L_{32} = M_{2i} \times 3/4 + (f_1 C_2 L_1 + f_1 C_2 L_2 + f_1 C_2 L_3 + \ldots + f_1 C_2 L_{32})/128 \quad \text{[Equation 3]}$$

If the initial value $M_{2i}$ stored in the second memory M2 is 32 (=0100000.0000000) and each of the output values $f_1 C_2 L_1 \sim f_1 C_2 L_{32}$ output from the subtractor 26 is 32 (=0100000.0000000), the reference fixed pattern noise $M_2 f_1 C_2 L_{32}$ finally stored in the second memory M2 is 32 (=0100000.0000000). Those skilled in the art to which example embodiments pertain may easily understand the values, that is, the reference fixed pattern noises, finally stored in each unit memory M1-Mn as a result of the 32 operations based on Equations 1-3.

In the active section of the second frame or n-th frame f2, the fixed pattern noise canceling circuit 20 may subtract the reference fixed pattern noises RFPN output from the memory 28 and the average value AVE output from the first operation circuit 22 from the fifth digital signals D5 output from the second operation circuit 24 in units of rows and accordingly outputs the digital signals D6 where the active fixed pattern noise FPNA is canceled.

In the vertical blank section of the second frame, the fixed pattern noise operation circuit 18 may receive the reference fixed pattern noises generated by Equations 1-3 and stored in the memory 28 in the vertical blank section of the first frame, or digital signals corresponding to the reference fixed pattern noises, and the blank fixed pattern noises D3 output from the third operation circuit 30 and stores new reference fixed pattern noises, or digital signals corresponding to the reference fixed pattern noises, in the memory 28.

Equation 4 mathematically expresses the value $M_1 f_2 C_1 L_{32}$ finally stored in the first memory M1 as a result of the 32 times of operations with respect to the first column C1 at the second frame f2. The value $M_1 f_2 C_1 L_{32}$ becomes a reference fixed pattern noise in the vertical blank section at the second frame f2.

$$M_1 f_2 C_1 L_{32} = M_1 f_1 C_1 L_{32} \times 3/4 + (f_2 C_1 L_1 + f_2 C_1 L_2 + f_2 C_1 L_3 + \ldots + f_2 C_1 L_{32})/128 \quad \text{[Equation 4]}$$

Here, the "$M_1 f_1 C_1 L_{32}$" is the value finally stored in the first memory M1 in the vertical blank section of the first frame $f_1$, that is, the reference fixed pattern noise. The "$f_2 C_1 L_1$" is the output value of the first column C1 in the first operation $L_1$ of the second frame f2, that is, the blank fixed pattern noise. The "$f_2 C_1 L_{32}$" is the output value of the first column C1 in the $32^{nd}$ operation $L_{32}$ of the second frame f2, that is, the blank fixed pattern noise.

Thus, after performing the 32 operations in the vertical blank section at the second frame, the reference fixed pattern noises finally stored in each unit memory M1-Mn may be expressed as in Equation 5.

$$M_n f_2 C_n L_{32} = M_n f_1 C_n L_{32} \times 3/4 + (f_2 C_n L_1 + f_2 C_n L_2 + f_2 C_n L_3 + \ldots + f_2 C_n L_{32})/128 \quad \text{[Equation 5]}$$

Referring to FIG. 5, the value "$M_1 f_2 C_1 L_{32}$" stored in the first memory M1 at the second frame f2 is determined based on the value "$M_1 f_1 C_1 L_{32}$" obtained in the vertical blank section of the first frame f1 and the values "$f_2C_1L_1$" through "$f_2C_1L_{32}$" output for each of the 32 operations in the vertical blank section of the second frame f2.

Thus, when the weighted value of an output value during the operation in the vertical blank section is $\frac{1}{2^a}$, the number of operations is 1 ($=2^b$), and the number of columns is n, the reference fixed pattern noises finally stored in each unit memory M1-Mn in the vertical blank section of the k-th frame may be expressed as in Equation 6.

$$M_nf_kC_nL_4 = M_nf_{k-1}C_nL_4 \times \frac{2^{a-b}-1}{2^{a-b}} + \quad \text{[Equation 6]}$$
$$(f_kC_nL_1 + f_kC_nL_2 + f_kC_nL_3 + \ldots + f_kC_nL_4)/2^a$$

Thus, when "a" is 7 and "b" is 5, the reference fixed pattern noises finally stored in each unit memory M1-Mn after the 32 operations is performed in the vertical blank section of the k-th frame can be expressed as in Equation 7.

$$M_nf_kC_nL_4 = M_nf_{k-1}C_nL_4 \times \frac{3}{4} + \quad \text{[Equation 7]}$$
$$(f_kC_nL_1 + f_kC_nL_2 + f_kC_nL_3 + \ldots + f_kC_nL_4)/128$$

Also, when "a" is 8 and "b" is 5, the reference fixed pattern noises finally stored in each unit memory M1-Mn after the 32 operations is performed in the vertical blank section of the k-th frame may be expressed as in Equation 8.

$$M_nf_kC_nL_4 = M_nf_{k-1}C_nL_4 \times \frac{3}{4} + \quad \text{[Equation 8]}$$
$$(f_kC_nL_1 + f_kC_nL_2 + f_kC_nL_3 + \ldots + f_kC_nL_4)/256$$

In the active section of the third frame or (n+1)th frame f3, the fixed pattern noise canceling circuit 20 may subtract the reference fixed pattern noises RFPN output from the memory 28 and the average value AVE output from the first operation circuit 22 from the digital signals D5 output from the second operation circuit 24 in units of rows and accordingly outputs the digital signals D6 where the active fixed pattern noise FPNA is canceled, in units of rows.

Referring to Equations 5-8, in the vertical blank section of the second frame f2, the value stored in each of the unit memories M1-Mn of the memory 28 may be updated to an weighted average value of the reference fixed pattern noises RFPN operated in the vertical blank section of the first frame f1 and the blank fixed pattern noises $f_kC_mL_1$ output from each column in the vertical blank section of the second frame f2. That is, the reference fixed pattern noises stored in each of the unit memories M1-M1 of the memory 28 may be updated in the vertical blank section of each frame.

Thus, the memory 28 of the fixed pattern noise operation circuit 18 according to example embodiments may trace for each frame the change of temperature with respect to time and/or the amount of change of the fixed pattern noises with respect to the change of a voltage.

In the vertical blank section of the n-th frame, the third operation circuit 30 of the fixed pattern noise operation circuit 18 may calculate the reference fixed pattern noises RFPN of the n-th frame based on the reference fixed pattern noises stored in the memory 28 and the fixed pattern noises output from the subtractor 26 for each operation in the vertical blank section of the n-th frame (operation S10). Thus, the reference fixed pattern noises stored in the memory 28 in the vertical blank section of the (n−1)th frame is updated to the reference fixed pattern noises calculated at the n-th frame.

That is, as described with reference to Equations 1-8, the third operation circuit 30 may update the values, that is, the reference fixed pattern noises, stored in each of the unit memories M1-Mn of the memory 28 for each operation, in units of rows. Thus, the memory 28 stores digital signals corresponding to the calculated reference fixed pattern noises (operation S20).

The fixed pattern noise canceling circuit 20 may receive combination signals output in the active section of the (n+1)th frame, the reference fixed pattern noises RFPN output from the storage device 28, and/or the average value AVE output from the first operation circuit 22 and cancels the active fixed pattern noises FPNA included in the combination signals in each column (operation S30).

Thus, the fixed pattern noise canceling circuit 20 may output the pixel signals D6 where the active fixed pattern noises FPNA are canceled. The fixed pattern noise canceling circuit 20 according to example embodiments may cancel the active fixed pattern noises based on the signals output from each of the first operation circuit 22, the second operation circuit 24, and the storage device 28 or based on the signals output from each of the second operation circuit 24 and the storage device 28, according to example embodiments.

Although in the present specification numerical references such as first, second, third, and so on are used for convenience of explanation, the numerical references are arbitrarily assigned merely for the convenience of explanation.

While example embodiments have been particularly shown and described, it will be understood by those skilled in the art that various changes in form and details may be made therein without departing from the spirit and scope of the invention as defined by the appended claims.

As described above, the method and apparatus for canceling a fixed pattern noise in a CMOS image sensor according to example embodiments may cancel an active fixed pattern noise output from each column based on the blank fixed pattern noises.

What is claimed is:

1. A method for canceling a fixed pattern noise in an image sensor, the method comprising:
    calculating second reference fixed pattern noises based on first reference fixed pattern noises operated in a vertical blank section of a (n−1)th frame and stored in a storage device and blank fixed pattern noises output in a vertical blank section of a n-th frame;
    updating the first reference fixed pattern noises stored in the storage device to the second reference fixed pattern noises;
    canceling active fixed pattern noises included in combination signals based on the combination signals including the active fixed pattern noises and pixel signals and the second reference fixed pattern noises output from the storage device, in an active section of an (n+1)th frame; and
    calculating an average value of the combination signals including the active fixed pattern noises and pixel signals in the active section of the (n+1)th frame, in units of rows,
    wherein n is a natural number greater than 1.

2. The method of claim 1, wherein the updating the first reference fixed pattern noises and the canceling the active fixed pattern noises are performed in units of rows.

3. The method of claim 1, further comprising:
generating analog constant voltages in response to a control signal in the vertical blank section of the n-th frame; and
digitalizing the analog constant voltages to the blank fixed pattern noises.

4. The method of claim 1, wherein the average value of the combination signals is obtained by dividing a total of digital signals output through a plurality of columns forming a row in the active section of the (n+1)th frame by the number of columns.

5. The method of claim 1, wherein the calculating the second reference fixed pattern noises comprises:
generating analog constant voltages in response to a control signal;
converting the analog constant voltages to first digital signals including noises and a first offset;
calculating an average value of the first digital signals;
generating second digital signals by adding a second offset to each of the first digital signals;
generating the blank fixed pattern noises by subtracting the average value from each of the second digital signals; and
calculating the second reference fixed pattern noises based on weighted average values of the first reference fixed pattern noises and the blank fixed pattern noises.

6. A method for canceling a fixed pattern noise in an image sensor, the method comprising:
storing in a storage device first reference fixed pattern noises operated in a vertical blank section of a (n−1)th frame;
generating constant voltages in response to a control signal in a vertical blank section of an n-th frame;
converting the constant voltages to first digital blank fixed pattern noises through an analog-to-digital conversion;
calculating a first average value of the first digital blank fixed pattern noises;
generating second digital blank fixed noises by adding an offset to each of the first digital blank fixed pattern noises;
generating third digital blank fixed noises by subtracting the first average value from each of the second digital blank fixed pattern noises;
calculating second reference fixed pattern noises based on the first reference fixed pattern noises stored in the storage device and the third digital blank fixed pattern noises and updating the first reference fixed pattern noises to the second reference fixed pattern noises;
converting analog pixel signals output from a pixel array in an active section of an (n+1)th frame to first digital signals including digital pixel signals and active fixed pattern noises;
calculating a second average value of the first digital signals;
generating second digital signals by adding the offset to each of the first digital signals; and
canceling active fixed pattern noises included in the second digital signals based on the second digital signals, the second reference fixed pattern noises output from the storage device, and the second average value.

7. A method for canceling a fixed pattern noise in an image sensor, the method comprising:
calculating reference fixed pattern noises based on blank fixed pattern noises, each of the blank fixed pattern noises being output based on a constant voltage having a level in a vertical blank section of each of a plurality of previous frames;
storing the calculated reference fixed pattern noises in a storage device; and
canceling active fixed pattern noises by receiving combination signals output in an active section of a present frame and including the active fixed pattern noise and pixel signals and the reference fixed pattern noises output from the storage device,
wherein the canceling the active fixed pattern noises includes
converting analog signals output through a plurality of columns of a pixel array to digital signals using an analog-to-digital converter,
obtaining an average value by dividing sum of values of the respective digital signals by the number of columns,
generating the combination signals by adding an offset to each of the digital signals, and
canceling the active fixed pattern noises for each column by receiving the combination signals, the average value, and the reference fixed pattern noises.

8. An apparatus for canceling a fixed pattern noise in an image sensor, the apparatus comprising:
a storage device configured to store first reference fixed pattern noises operated in a vertical blank section of an (n−1)th frame;
a fixed pattern noise operation circuit configured to calculate second reference fixed pattern noises based on the first reference fixed pattern noises stored in the storage device and blank fixed pattern noises output in a vertical blank section of an n-th frame and to output the second reference fixed pattern noises to the storage device to update the first reference fixed pattern noises to the second reference fixed pattern noises; and
a fixed pattern noise canceling circuit configured to cancel active fixed pattern noises in combination signals based on the combination signals output in an active section of an (n+1)th frame and including the active fixed pattern noises and pixel signals and the second reference fixed pattern noises output from the storage device,
wherein the fixed pattern noise operation circuit includes
an analog-to-digital converter configured to convert constant voltages output in the vertical blank section of the n-th frame to first digital signals,
a first operation circuit configured to calculate an average value of the first digital signals,
a second operation circuit configured to generate second digital signals by adding an offset to each of the first digital signals,
a subtractor configured to generate the blank fixed pattern noises by subtracting the average value from each of the second digital signals output from the second operation circuit, and
a third operation circuit configured to calculate the second reference fixed pattern noises based on the first reference fixed pattern noises and the blank fixed pattern noises output from the subtractor and to output the second reference fixed pattern noises to the storage device to update the first reference fixed pattern noises to the second reference fixed pattern noises, and
wherein the "n" is a natural number greater than 1.

9. The apparatus of claim 8, wherein the third operation circuit is an infinite impulse response filter.

10. The apparatus of claim 8, wherein the analog-to-digital converter is configured to converts analog signals output from a pixel array in the active section of the (n+1)th frame to the third digital signals, the first operation circuit is configured to calculates an average value of the third digital signals in the active section of the (n+1)th frame, the second operation circuit is configured to generate the combination signals including the active fixed pattern noises and the pixel signals by adding the offset to each of the third digital signals in the active section of the (n+1)th frame, and the fixed pattern noise canceling circuit is configured to cancels the active fixed pattern noises in the combination signals based on the combination signals, the average value of the third digital signals, and the second reference fixed pattern noises in the active section of the (n+1)th frame.

11. An image sensor comprising:

a pixel array having a plurality of unit pixels formed among a plurality of rows and a plurality of columns and configured to output analog pixel signals through the columns in an active section;

a constant voltage generator configured to supply a constant voltage having a level to the columns in a vertical blank section;

an analog-to-digital converter configured to convert analog signals output from the columns to digital signals; and an apparatus for canceling a fixed pattern noise, wherein the apparatus includes a storage device configured to store first reference fixed pattern noises operated in a vertical blank section of an (n−1)th frame, a fixed pattern noise operation circuit configured to calculate second reference fixed pattern noises based on the first reference fixed pattern noises stored in the storage device and blank fixed pattern noises output in a vertical blank section of an n-th frame and to output the second reference fixed pattern noises to the storage device to update the first reference fixed pattern noises to the second reference fixed pattern noises, and a fixed pattern noise canceling circuit configured to cancel active fixed pattern noises in combination signals based on the combination signals output in an active section of an (n+1)th frame and including the active fixed pattern noises and pixel signals and the second reference fixed pattern noises output from the storage device, wherein the fixed pattern noise operation circuit includes a first operation circuit configured to calculate an average value of the digital signals output from the analog-to-digital converter, a second operation circuit configured to generate second digital signals by adding an offset to each of the digital signals, a subtractor configured to subtract the average value from each of the second digital signals output from the second operation circuit and to generate the blank fixed pattern noises; and a third operation circuit configured to calculate the second reference fixed pattern noises based on the first reference fixed pattern noises and the blank fixed pattern noises output from the subtractor and to output the second reference fixed pattern noises to the storage device to update the first reference fixed pattern noises to the second reference fixed pattern noises, and wherein the "n" is a natural number greater than 1.

12. The image sensor of claim 11, wherein the third operation circuit is an infinite impulse response filter.

13. The image sensor of claim 11, wherein the analog-to-digital converter is configured to converts analog signals output from a pixel array in the active section of the (n+1)th frame to the third digital signals, the first operation circuit is configured to calculates an average value of the third digital signals in the active section of the (n+1)th frame, the second operation circuit is configured to generate the combination signals including the active fixed pattern noises and the pixel signals by adding the offset to each of the third digital signals in the active section of the (n+1)th frame, and the fixed pattern noise canceling circuit is configured to cancels the active fixed pattern noises in the combination signals based on the combination signals, the average value of the third digital signals, and the second reference fixed pattern noises in the active section of the (n+1)th frame.

* * * * *